(12) United States Patent
Alexander et al.

(10) Patent No.: US 8,930,104 B1
(45) Date of Patent: Jan. 6, 2015

(54) SYSTEM AND METHOD FOR DISTRIBUTING TORQUE AND A POWERTRAIN USING THE SAME

(71) Applicant: Honda Motor Co., Ltd., Tokyo (JP)

(72) Inventors: Aaron R Alexander, Sunbury, OH (US); Randy Lee Skiles, Marysville, OH (US); Darren F Stursa, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 48 days.

(21) Appl. No.: 13/945,662

(22) Filed: Jul. 18, 2013

(51) Int. Cl.
*B60W 10/06* (2006.01)
*B60W 10/119* (2012.01)
*B60W 10/18* (2012.01)
*B60K 23/08* (2006.01)

(52) U.S. Cl.
CPC .............. *B60K 23/08* (2013.01); *B60W 10/119* (2013.01); *B60Y 2400/3032* (2013.01); *B60Y 2400/301* (2013.01); *B60Y 2400/404* (2013.01); *B60Y 2400/82* (2013.01); *B60K 2023/0858* (2013.01)
USPC .......................................................... 701/69

(58) Field of Classification Search
USPC ..................... 701/69; 477/174, 180
See application file for complete search history.

(56) References Cited

U.S. PATENT DOCUMENTS

| | | | |
|---|---|---|---|
| 6,059,065 A | 5/2000 | Takeda et al. | |
| 6,591,179 B1 | 7/2003 | Check et al. | |
| 6,729,426 B2 | 5/2004 | Suzuki | |
| 6,865,470 B2 | 3/2005 | Ohtsu | |
| 6,898,504 B2 | 5/2005 | Kadota | |
| 6,945,909 B2 | 9/2005 | Maekawa | |
| 7,434,646 B2 | 10/2008 | Thompson et al. | |
| 7,565,937 B2 | 7/2009 | Deguchi et al. | |
| 7,974,759 B2 | 7/2011 | Muta et al. | |
| 8,002,070 B2 | 8/2011 | Ghoneim et al. | |
| 8,078,374 B2 | 12/2011 | Vogel et al. | |
| 2003/0036837 A1* | 2/2003 | Katayama et al. | 701/69 |
| 2009/0076696 A1 | 3/2009 | Perkins et al. | |
| 2012/0024614 A1* | 2/2012 | Sigmund et al. | 180/248 |
| 2012/0059562 A1* | 3/2012 | Skiles | 701/69 |
| 2012/0245814 A1* | 9/2012 | Buszek et al. | 701/69 |
| 2012/0293317 A1* | 11/2012 | Hanna et al. | 340/441 |

FOREIGN PATENT DOCUMENTS

| | | |
|---|---|---|
| JP | 1-114526 A | 5/1989 |
| JP | 3-74222 A | 3/1991 |

* cited by examiner

*Primary Examiner* — Edwin A Young
(74) *Attorney, Agent, or Firm* — Kenealy Vaidya LLP (57) ABSTRACT

An apparatus and a method for distributing torque from a power source to a plurality of vehicle wheels, where the method can include obtaining data indicative of a rotational velocity of one of the wheels and data indicative of a position of the accelerator, determining a wheel acceleration based on the rotational velocity data, comparing the wheel acceleration and at least one of the rotational velocity data and the position data with a respective threshold condition, signaling the actuator to engage the second subset with the torque of the power source when at least one of the threshold conditions is met, and signaling the actuator to disengage the second subset from the power source when none of the threshold conditions is met. The apparatus can include a powertrain with a system having a control device that can distribute the torque in accordance with the method.

20 Claims, 4 Drawing Sheets

SYSTEM AND METHOD FOR DISTRIBUTING TORQUE AND A POWERTRAIN USING THE SAME

BACKGROUND

Description of the Related Art

Typical vehicle drivetrains can be configured as either two-wheel-drive (e.g., front-wheel drive or rear-wheel drive) or all-wheel drive (e.g., part-time or full-time). In a part-time, all-wheel-drive (AWD) configuration, the vehicle drivetrain operates primarily in a two-wheel-drive (2WD) configuration and the vehicle is propelled by primary drive wheels (e.g., front wheels) while the secondary drive wheels (e.g., rear wheels) are selectively engaged/disengaged to improve tractive effort as conditions warrant. The secondary drive wheels are disengaged to maximize fuel efficiency in conditions where two-wheel-drive propulsion is sufficient.

As compared to a similar two-wheel-drive vehicle, an all-wheel-drive vehicle typically has a larger mass due to additional drivetrain components that transmit torque from the vehicle's power source to the secondary drive wheels. These additional components also can add to the dynamic power losses that result from increased inertia, fluid pumping losses, frictional losses, as well as other factors. The additional mass and dynamic losses can result in increased fuel consumption compared to a similar two-wheel-drive vehicle.

Engagement/disengagement of the secondary drive wheels can be initiated by the vehicle operator through a mechanical linkage or via an electrical switch and electro-mechanical actuator assembly. Alternatively, a passive hydro-mechanical system can be utilized. Another alternate approach to engage/disengage the secondary drive wheels can employ an electronic control unit (ECU) to engage/disengage the secondary drive wheels via an actuator assembly in electrical communication with the ECU. The ECU can rely upon one or more sensors that provide the ECU with data indicative of certain condition(s) of the vehicle.

The ECU also typically employs an algorithm that utilizes vehicle acceleration to determine when the secondary drive wheels should be engaged/disengaged. These algorithms can calculate a real-time vehicle acceleration based on the real-time torque output by the vehicle's power source and the vehicle's inertia. Typically, the vehicle's inertia is a fixed value in the algorithm and determined during the development of the vehicle. However, a consumer's use of the vehicle can cause the real-time mass of the vehicle to vary significantly from the fixed inertia value of the algorithm. This can result in inefficient engagement of the secondary drive wheels which, in turn, can increase the vehicle's fuel consumption.

Accordingly, there is a need for automated engagement/disengagement of the secondary drive wheels that can minimize adverse impact on the vehicle's fuel consumption while maintaining advantageous operation of the secondary drive wheels.

SUMMARY

According to one aspect of the disclosure, a system for distributing torque from a power source of a vehicle can include a first subset of a plurality of wheels, a second subset of wheels, an accelerator pedal, an actuator assembly and a controller. The first subset wheels can be driven by the torque when the vehicle is propelled by the power source. The second subset of wheels can be different from the first subset and can be selectively driven by the torque when the vehicle is propelled by the power source. The accelerator pedal can be configured to modulate the torque of the power source. The actuator assembly can selectively engage the second subset with the torque of the power source. The controller can be in electrical communication with the actuator assembly and configured to obtain data indicative of a rotational velocity of at least one of the plurality of wheels and data indicative of a position of the accelerator pedal, determine a wheel acceleration based on the rotational velocity data, compare at least one of the wheel acceleration, the rotational velocity data, and the position data with a respective one of a plurality of threshold conditions, signal the actuator to engage the second subset with the torque of the power source when one of the threshold conditions is met, and signal the actuator to disengage the second subset from the torque of the power source when none of the threshold conditions is met.

According to another aspect of the disclosed subject matter, an on-demand all-wheel-drive powertrain for an automotive vehicle can include a power source configured to output torque, a multi-ratio transmission that can be driven by the torque output by the power source when the power source propels the vehicle, at least one wheel that can be driven by the transmission when the power source propels the vehicle, at least one other wheel that can be selectively driven by the transmission when the power source propels the vehicle, an accelerator pedal, a first sensor, a second sensor, actuator assembly, and a controller. The accelerator pedal can be configured to modulate the torque output by the power source. The first sensor can be configured to output data indicative of a rotational velocity of the at least one wheel. The second sensor can be configured to output data indicative of a position of the accelerator pedal. The actuator assembly can selectively connect the at least one other wheel to the multi-ratio transmission. The controller can be in electrical communication with each of the actuator assembly, the first sensor and the second sensor. The controller can be configured to determine a wheel acceleration based on the data output from the first sensor, compare the wheel acceleration and at least one of the speed data and the position data to a respective one of a plurality of all-wheel drive threshold conditions, select a primary torque path when none of the all-wheel drive threshold conditions are met, select a supplemental torque path when one of the all-wheel drive threshold conditions is met, signal the actuator to disconnect the at least one other wheel from the transmission when the primary torque path is selected, and signal the actuator to connect the at least one other wheel to the transmission when the supplemental torque path is selected.

According to yet another aspect of the disclosed subject matter, a method for distributing torque from a power source to a plurality of wheels of a vehicle having a dynamic assistance system configured to supplement an operator's input to the vehicle, can include: obtaining data indicative of a rotational velocity of one of the plurality of wheels and data indicative of a position of the accelerator pedal; determining a wheel acceleration based on the rotational velocity data; comparing the wheel acceleration and at least one of the rotational velocity data and the position data with a respective one of a plurality of threshold conditions; signaling an actuator to engage the second subset with the torque of the power source when at least one of the threshold conditions is met; and signaling an actuator to disengage the second subset from the torque of the power source when none of the threshold conditions is met.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
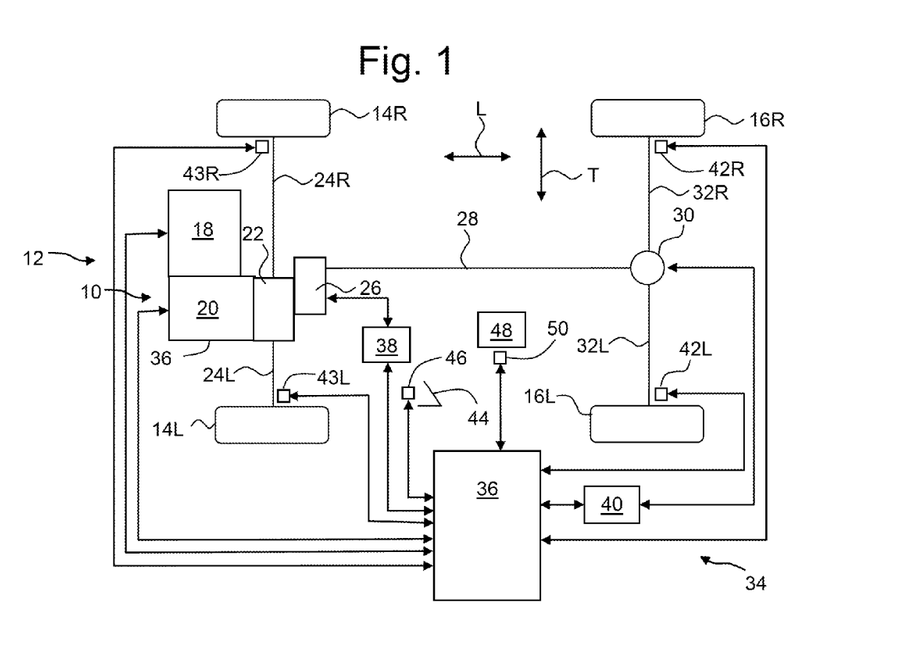
FIG. 1 is a schematic view of an exemplary powertrain for a vehicle made in accordance with the disclosed subject matter.

FIG. 1 illustrates an embodiment of a powertrain 10 for a vehicle 12. The powertrain 10 can be governed by a control system 34 that implements an algorithm that has a primary control path and at least one secondary control path. The primary control path can be based on wheel speed acceleration and the at least one secondary control path can be based on another condition of the vehicle. As will be apparent from the description below, these control paths can provide a more accurate assessment for advantageous engagement/disengagement of the secondary drive wheels as compared to a process that relies on a fixed inertia value for the vehicle.

The vehicle 12 has a longitudinal direction L, a transverse (or lateral) direction T perpendicular to the longitudinal direction, and a vertical direction V perpendicular to both the longitudinal direction L and the transverse direction T. The powertrain 10 can be configured as an on-demand, part-time, all-wheel drive system in accordance with principles of the disclosed subject matter. This exemplary powertrain 10 can be configured such that the steerable front wheels 14L, 14R are the primary drive wheels and the rear wheels 16L, 16R are selectively automatically driven when additional tractive effort is appropriate for the given vehicle conditions. However, the powertrain 10 can be configured such that the rear wheels 16L, 16R are the primary drive wheels and the front wheels 14L, 14R are driven only when additional tractive effort is appropriate. In other embodiments, the powertrain 10 can be configured as: a full-time, all-wheel drive system; a manually-engageable, part-time all-wheel drive system; a front-wheel drive system; or a rear-wheel drive system.

The powertrain 10 can include a power source 18 (e.g., an engine), a transmission 20, the pair of front wheels 14L, 14R, the pair of rear wheels 16L, 16R, a front differential assembly 22, a pair of front driveshafts 24L, 24R, a power-take-off assembly 26, a propeller shaft 28, a rear differential assembly 30, a pair of rear driveshafts 32L, 32R and the control system 34.

The control system 34 can be configured to automatically engage/disengage the rear wheels 16L, 16R with the power source 18, as appropriate. The control system 34 can also modulate how much of the torque from the power source 18 is distributed to each of the rear wheels 16L, 16R.

The control system 34 can include an electronic control unit (ECU) 36 or other controller (e.g., a central processing unit (CPU), The control system can also include one or more of a power-take-off actuator assembly 38, a rear differential actuator assembly 40, a pair of rear wheel speed sensors 42L, 42R, a pair of front wheel speed sensors 43L, 43R, a fuel control assembly 44, 46, and a brake actuator assembly 48, 50. The controller (e.g., ECU 36) can be in electrical communication with each of the actuator assemblies 38, 40, each of the sensors 42L, 42R, 43L, 43R, the fuel control assembly 44, 46 and the brake actuator assembly 48, 50.

The power-take-off actuator assembly 38 can be mounted within the power-take-off assembly 26. The power-take-off actuator assembly 38 can include a coupling assembly and an actuator assembly. The actuator assembly can affect the coupling assembly such that the coupling assembly selectively engages the power-take-off with either the front differential assembly 22 or the propeller shaft 28. The actuator assembly can include a hydraulic actuator assembly, an electric actuator assembly, an electro-mechanical actuator assembly, or an electro-magnetic actuator assembly. The coupling assembly can include a friction disc assembly having one or more friction plates, a viscous clutch assembly having one or more plates, or other similar coupling system that can permit selective engagement and disengagement of an input component of the clutch assembly with the front differential assembly 22.

The rear differential actuator assembly 40 can be mounted within the rear differential assembly 30. The rear differential actuator assembly 40 can cause selective engagement and disengagement of the rear drive shafts 32L, 32R with the propeller shaft 28. The rear differential actuator assembly 40 can modulate the amount of torque transmitted to each of the rear drive shafts 32L, 32R when the rear differential actuator assembly 40 engages the rear drive shafts 32L, 32R with the propeller shaft 28 such that each rear driveshaft 32L, 32R can receive either the same or a different amount of the torque from the propeller shaft 28. An exemplary rear differential assembly having a pair of electro-magnetically actuated clutch assemblies is disclosed in U.S. Patent Application Publication No. 2007/0260388, which is incorporated herein by reference in its entirety.

The wheel speed sensors 42L, 42R, 43L, 43R can be mounted on an appropriate portion of the vehicle 12 to detect rotation of the respective wheel 14L, 14R, 16L, 16R (or the respective driveshaft 24L, 24R, 32L, 32R). The raw data from the wheel speed sensors 42L, 42R, 43L, 43R can be processed by one or each of the wheel speed sensors 42L, 42R, 43L, 43R or by the ECU 36 to indicate a rotational speed of the respective wheel 14L, 14R, 16L, 16R. The wheel speed sensors 42L, 42R, 43L, 43R can be any sensor known in the art to provide the appropriate data.

Alternatively, instead of being in communication with the ECU 36, the wheels speed sensors 42L, 42R, 43L, 43R can be in electrical communication with an additional controller (not illustrated) that is different from the ECU 36. This additional controller can be in electrical communication with the ECU 36. This additional controller can be utilized to affect a different control system of the vehicle 12, such as, but not limited to, an anti-lock brake system (not illustrated). This additional controller can be configured to receive processed data from the wheel speed sensors 42L, 42R, 43L, 43R or to receive the raw data from the wheel speed sensors 42L, 42R, 43L, 43R and process the raw data to indicate a rotational speed of the respective wheels 14L, 14R, 16L, 16R. Then, this additional controller can electrically communicate the processed data to the ECU 36.

The fuel control assembly 44, 46 can include an accelerator pedal 44 and a position sensor 46 configured to output data indicative of the position of the accelerator pedal 44. In an alternate embodiment, movement of a component of the fuel metering system different from the accelerator pedal 44, such as but not limited to a throttle linkage or a throttle valve, can be measured by an appropriate sensor and this data can be provided to and processed by the controller (e.g., ECU 36).

Alternatively, the position sensor 46 can be in electrical communication with an additional controller (not illustrated) that is different from the ECU 36. This additional controller can be in electrical communication with the ECU 36. This additional controller can be utilized to affect a different control system of the vehicle 12, such as, but not limited to, control of the power source 18 or of the fuel delivery system (not illustrated). This additional controller can be configured to receive processed data from the position sensor 46 or to receive the raw data from the position sensor 46 and process the raw data to indicate a position of the accelerator pedal 44. Then, this additional controller can electrically communicate the processed data to the ECU 36.

The brake actuator assembly 48, 50 can include a brake pedal 48 and a position sensor 50 configured to output data indicative of the position of the brake pedal 48. In an alternate embodiment, movement of an actuator component different from the brake pedal, such as but not limited to a master cylinder, a slave cylinder, or a brake pad, can be measured by an appropriate sensor and this data can be provided to and processed by the ECU 36.

The signals from the wheel speed sensors 42L, 42R, 43L, 43R can be averaged, or they can be subject to a minimum function analysis, or another appropriate process can be employed. Based on data received from any combination of the sensors 42L, 42R, 43L, 43R, 46, 50 and any other inputs known in the art to be appropriate, the ECU 36 can manipulate the actuator assemblies 38 and 40 to vary the distribution of torque from the power source 18 to a respective one of the rear wheels 16L, 16R in a manner that can enhance the performance of the vehicle 12 based on current driving conditions. Further details of the processing of this sensor data will be discussed below with respect to the exemplary algorithms illustrated in FIGS. 2 and 3.

Figure 2:
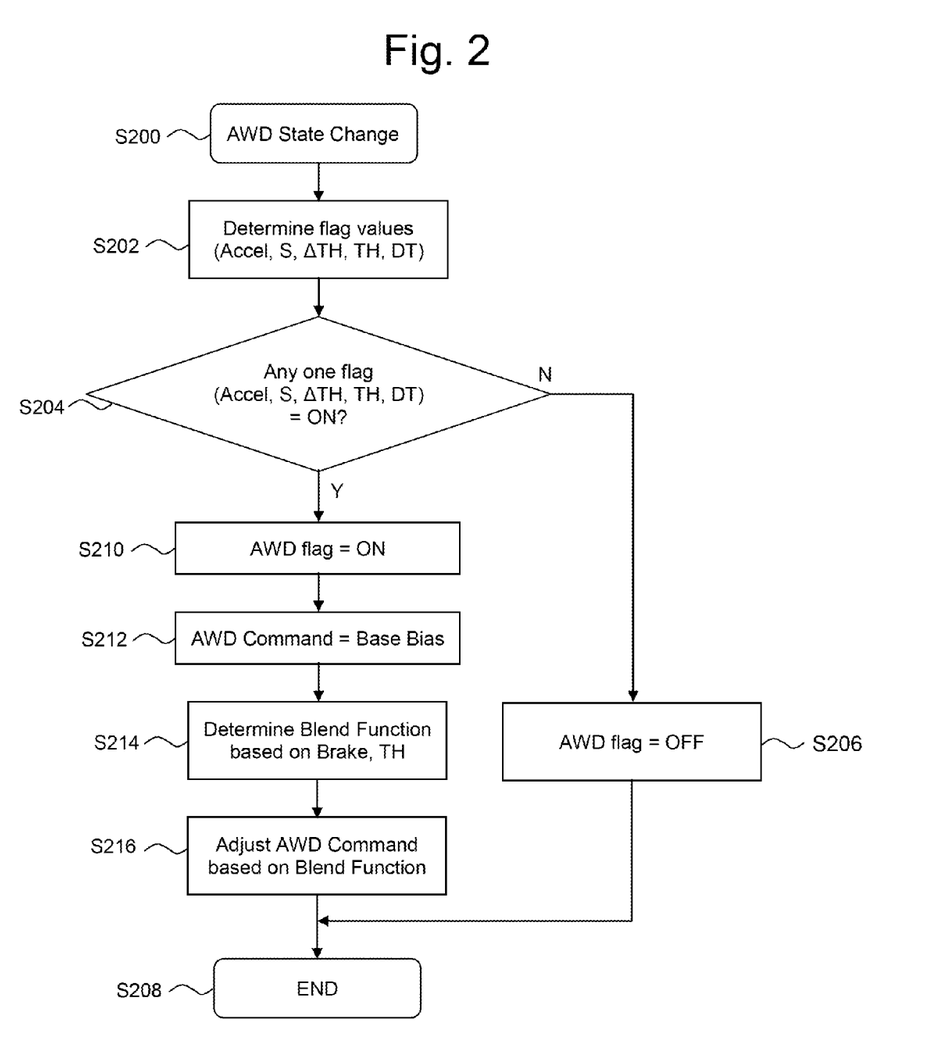
FIG. 2 is a flowchart representative of a process for distributing torque in accordance with the disclosed subject matter.

FIG. 2 shows a flowchart depiction of an exemplary algorithm that can be used to determine the distribution of torque amongst the wheels 14L, 14R, 16L, 16R of the vehicle 12 in accordance with an embodiment of the disclosed subject matter. This exemplary propulsion mode selection algorithm can permit a control device, such as the ECU 36, to select the most advantageous one of the 2WD propulsion mode and the AWD propulsion mode based on real-time acceleration of the vehicle 12. Selection of the AWD propulsion mode is most advantageous when the vehicle 12 is subject to relatively large accelerations and selection of the 2WD propulsion mode is most advantageous when the vehicle 12 is subject to relatively low accelerations or when the vehicle is cruising at a substantially constant speed.

Under certain circumstances, the real-time acceleration of the vehicle 12 may lag the operator's demand for acceleration. This can be caused by any combination of various factors such as, but not limited to, the inertia of the vehicle 12 and/or a towed trailer, or the inclination of the surface upon which the vehicle 12 is travelling. In order to anticipate impending acceleration during this lag period, the exemplary algorithm in accordance with the disclosed subject matter can process other input data such as, but not limited to, the real-time wheel speed or the real-time position of the accelerator pedal.

The exemplary algorithm begins at step S200 and then can proceed to step S202 where a value for each of a plurality of flags can be determined by a control device such as the ECU 36. These flags can represent an actual acceleration or an impending acceleration where the AWD propulsion mode may be advantageous. Based on the value of each of these flags, the algorithm can permit a control device, such as the ECU 36, to determine the most advantageous one of a 2WD propulsion mode (i.e., a primary torque path) and an AWD propulsion mode (i.e., a supplemental torque path) for the vehicle 12. In the 2WD propulsion mode, a control device such as the ECU 36 can cause torque from a source such as the power source 18 to be distributed to at least one of a primary set of wheels (e.g., the front wheels 14L, 14R) to propel the vehicle 12, while a supplemental set of wheels (e.g., the rear wheels 16L, 16R) are idle. In the AWD propulsion mode, a control device such as the ECU 36 can cause torque from a source such as the power source 18 to be distributed to at least one of the primary set of wheels and to at least one of the supplemental set of wheels to propel the vehicle 12.

A control device, such as the ECU 36, can assign each of these flags a value based on a plurality of threshold conditions. In the exemplary embodiment of FIG. 2, the threshold conditions can include, but are not limited to, an acceleration threshold, a speed threshold, a delta threshold, a position threshold, and a torque threshold. The predetermined values of these thresholds can be stored in an appropriate memory device internal to a control device, such as the ECU 36, or external to and accessible by the control device.

The actual value of each threshold can be set to achieve the desired performance specification of the vehicle 12. In an exemplary embodiment, these threshold values can be set at values where the AWD propulsion mode can be limited to more predictable distributions of torque transmission through a system, such as the powertrain 10, as compared to selecting the AWD propulsion mode based on a predetermined estimate of the inertia of the vehicle 12. Further, these thresholds can be set at values where the AWD propulsion mode is selected to more accurately match the actual performance of the vehicle 12 to the operator's expectation of vehicle performance. Additionally, these thresholds can be set at values where selection of the AWD propulsion mode during less than optimal efficiency can be precluded. The threshold values can be based on any combination of these or other pertinent factors to achieve the desired performance of the vehicle 12. Thus, the system components, such as those of the powertrain 10, can be better optimized for at least weight, durability, and performance. These optimizations can permit the fuel economy of the AWD vehicle 12 to more closely approach that of a 2WD vehicle.

In the exemplary embodiment of FIG. 2, a control device, such as the ECU 36, can compare the vehicle acceleration to the acceleration threshold during step S202. Here, the control device can be configured to determine the vehicle acceleration based on data received from any one or combination of input devices such as the wheel speed sensors 42L, 42R, 43L, 43R associated with the respective one of the primary set of wheels (e.g., 14L and 14R, or 16L and 16R). Any appropriate calculation can be used, such as but not limited to, determining the vehicle acceleration from two sequential sets of data from the pertinent sensor(s) such as one or more of the wheel speed sensors 42L, 42R, 43L, 43R.

In an alternate embodiment, a first acceleration value can be determined from data provided by a first sensor, such as one of the wheel speed sensors 42L, 42R, 43L, 43R, and a second acceleration and can be determined from data provided by a second sensor, such as a second one of the wheel speed sensors 42L, 42R, 43L, 43R, where the data from both sensors is concurrent. The chosen sensors can be associated with one or both of the primary set of wheels or one sensor can be associated with one wheel of the primary set of wheels and the other sensor can be associated with one wheel of the supplemental set of wheels. Then, a control device, such as the ECU 36, can average the first and second acceleration values to determine the vehicle acceleration. In yet another alternate embodiment, an acceleration value can be calculated based on a respective sensor data set associated with each wheel of the vehicle 12. Then, a control device, such as the ECU 36 processes these four acceleration values in an appropriate manner to determine the value of the vehicle acceleration, such as but not limited to, averaging all four values or dropping one or both of the high and low values and averaging the remaining two values.

After determining the vehicle acceleration, a control device, such as the ECU 36, can compare the vehicle acceleration to the acceleration threshold. Sensor noise or road surface variation(s) can cause fluctuations in the signal(s) from the sensors, such as the wheel speed sensors 42L, 42R, 43L, 43R, which the control device could misinterpret as vehicle acceleration. In order to minimize or prevent this erroneous determination of vehicle acceleration, the acceleration threshold can be set at a value that is greater than sensor signal value fluctuations caused by sensor noise and road surface variations(s) when the vehicle 12 is actually travelling at a substantially constant speed. This built-in deadband can prevent or minimize the potential for the control device to transition back and forth (also referred to as hunting) between the AWD propulsion mode and the 2WD propulsion mode.

If a control device, such as the ECU 36, determines that the vehicle acceleration is greater than the acceleration threshold, then the control device can set the acceleration flag to an appropriate value, such as but not limited to "ON" representative of an advantageous AWD propulsion mode. If the control device determines that the vehicle acceleration is less than or substantially equal to the acceleration threshold, then the control device can set the acceleration flag to an appropriate value, such as but not limited to "OFF", representative of an advantageous 2WD propulsion mode.

Also during step S202, a control device, such as the ECU 36, can compare the wheel speed data from at least one of the sensors, such as the wheel speed sensors 42L, 42R, 43L, 43R, to the speed threshold. The control device can use the data relied on for the determination of the vehicle acceleration. In this exemplary embodiment, the control device can use the sensor data relied on to determine the vehicle acceleration. In an alternate embodiment, the control device can sample data from any combination of a group of sensors, such as the wheel speed sensors 42L, 42R, 43L, 43R, and then calculate an average wheel speed based on this data sampling. This data sampling can average all of the data, drop one or both of the highest data value and the lowest data value and then calculate the average wheel speed. Other data processing techniques can be used in order to achieve the performance specifications of the vehicle 12.

The speed threshold can be set at a value that corresponds to low speed operation of the vehicle 12 such as, but not limited to, initial vehicle launch from rest, low speed propulsion on an inclined surface, and trailer maneuvering. At these low speeds, the added tractive effort provided by the AWD propulsion mode can be advantageous in overcoming the inertia of the vehicle and or the gravitation resistance to vehicle propulsion.

If a control device, such as the ECU 36, determines that the wheel speed data is less than the speed threshold, then the control device can set the speed flag to an appropriate value, such as but not limited to "ON", which is representative of an advantageous AWD propulsion mode. If the control device determines that the wheel speed data is greater than or substantially equal to the speed threshold, then the control device can set the speed flag to an appropriate value, such as but not limited to "OFF", which is representative of an advantageous 2WD propulsion mode.

Further during step S202, a control device, such as the ECU 36, can compare the position data to a position threshold. The position threshold can be set at a value that corresponds to a position of an operator input device, such as the accelerator pedal 44, that can cause a torque source, such as the power source 18 (e.g., an engine), to output an amount of torque that can accelerate the vehicle from a constant speed condition at a substantial rate. This can permit the control device to select the AWD propulsion mode in anticipation of acceleration of the vehicle 12 during the initial transient phase of operation of the vehicle 12 where the actual acceleration of the vehicle 12 lags the operator's request due to resisting forces such as but not limited to inertial forces, aerodynamic drag, and/or gravity.

If a control device, such as the ECU 36, determines that the position data is greater than the position threshold, then the control device can set the position flag to an appropriate value, such as but not limited to "ON", which is representative of an advantageous AWD propulsion mode. If the control device determines that the position data is less than or substantially equal to the position threshold, then the control device can set the position flag to an appropriate value, such as but not limited to "OFF" which is representative of an advantageous 2WD propulsion mode.

Additionally during step S202, a control device, such as the ECU 36, can compare a delta position value to the delta threshold. The control device can determine the delta position value by calculating the difference in value between a first set of position data and a second set of position data measured subsequent to the first set of position data. This difference can be assigned an absolute value or it can be a positive value or a negative value, where a negative value indicates a request for deceleration by the operator.

The delta threshold can be set at a value that corresponds to a change in the torque output by the power source 18 that can cause the vehicle to accelerate from a constant speed condition at a substantial rate, where the second set of position data would not meet the position threshold. Thus, the control device can anticipate a request for acceleration of the vehicle 12 based on the amount of change in position of an operator device, such as the pedal 44, even though the final position does not exceed the position threshold.

If a control device, such as the ECU 36, determines that the delta position value is greater than the delta threshold, then the control device can set the delta flag to an appropriate value, such as but not limited to "ON" representative of an advantageous AWD propulsion mode. If the control device determines that the delta position value is less than or substantially equal to the delta threshold, then the control device can set the delta flag to an appropriate value, such as but not limited to "OFF" representative of an advantageous 2WD propulsion mode.

Additionally, during step S202, a control device, such as the ECU 36, can compare a driveline torque value (DT) to the torque threshold. Under the conditions of substantially constant vehicle speed and relatively high driveline torque, it may be advantageous to engage the AWD propulsion mode. High driveline torque may result from "non-normal driving mode" factors such as, but not limited to, uphill travel, towing, carrying roof-mounted cargo, etc. (as compared to a "normal driving mode" which includes but is not limited to travel along a substantially level road surface). The torque threshold can be set at a value that corresponds to a relatively high driveline torque such that the transition between 2WD mode and AWD mode can be effected as smoothly as possible and/or with a minimum of driveline shock.

The control device can determine the driveline torque value when the vehicle 12 is travelling at a substantially constant vehicle speed. The driveline torque value can be determined from the currently engaged gear ratio of the transmission 20 multiplied by the torque output by the power source 18 based on the current engine speed. The gear ratios of the transmission 20 and the data of output torque vs. engine speed can be predetermined and stored in an appropriate memory device that is accessible by the control device during the execution of step S202.

This driveline torque comparison can permit a control device, such as the ECU 36, to anticipate a driver command, such as but not limited to an increase in throttle, to engage the AWD mode at a driveline torque value that is less than the anticipated driveline torque value. Thus, undesired shock or uncomfortable acceleration as perceived by the vehicle occupant(s) can be minimized or eliminated. Further, a determination of driveline torque based on this data can prevent false determinations of acceleration that can result when using an inertia-based driveline torque calculation. For example, under a condition of a relatively high driveline torque (such as but not limited to travelling uphill, travelling while towing, travelling with roof-mounted cargo, etc.) as compared to a normal driving mode, an inertia-based torque calculation can determine a false acceleration due to the increased force required to propel the vehicle. Thus, the control algorithms in accordance with the disclosed subject matter can be more accurate than an inertia-based calculation because they can avoid this false acceleration determination.

The torque threshold can be a fixed value or it can be variable. A fixed torque threshold can be set in order to achieve the desired performance target(s) set for the vehicle. The torque threshold can be set at a driveline torque value that is higher than the threshold used for constant speed travel on a substantially level driving surface where the vehicle is substantially unburdened by an additional or excessive load (for example, excessive carried or trailered loads). In an exemplary embodiment, a variable torque threshold can be a function of the load on each axle. This can permit a control device, such as ECU 36, to vary the amount of torque distributed to each axle based on the changing traction available at each wheel. The variable torque threshold can be a function of additional factor(s) or a function independent of axle load in order to achieve the desired performance target(s) set for the vehicle.

In an alternate embodiment, the control device can receive data indicative of the driveline torque value from an appropriate sensor or group of sensors, such as a torque sensor associated with the output shaft of the transmission 20, and/or a torque sensor associated with the output shaft of the power source 18, and/or a respective torque sensor(s) associated with the front driveshafts 24L, 24R, and/or a respective torque sensor(s) associated with the rear driveshafts 32L, 32R.

In another alternate embodiment, the driveline torque data can be compared to the torque threshold in a control path separate from step S202. As a result, this driveline torque check can operate in the background and provide a back-up to the exemplary algorithm of FIG. 2 where the exemplary step S202 described above does not include a comparison of the driveline torque to the torque threshold.

If a control device, such as the ECU 36, determines that the driveline torque value is greater than the torque threshold, then the control device can set the torque flag to an appropriate value, such as but not limited to "ON" representative of an advantageous AWD propulsion mode. If the control device determines that the driveline torque value is less than or substantially equal to the torque threshold, then the control device can set the torque flag to an appropriate value, such as but not limited to "OFF" representative of an advantageous 2WD propulsion mode.

Comparison of the driveline torque value to the torque threshold can be omitted from step S202 based on the performance specifications established for the vehicle 12.

After assigning an appropriate value to each of the flags, a control device, such as the ECU 36, can proceed to step S204. At step S204, the control device can check which, if any, of the flags has a value representative of an advantageous AWD propulsion mode. This check can enable the control device to set a value for an AWD flag. This AWD flag can permit the control device, or another controller, to activate the AWD propulsion mode. A control device, such as the ECU 36, or another control device, can follow an algorithm separate from the algorithm represented in FIG. 2 to determine how much of the torque output by a source, such as the power source 18 (e.g., an engine), goes to each wheel, such as wheels 14L, 14R, 16L, 16R. This separate torque modulation algorithm can be triggered when the AWD flag has an appropriate value, such as but not limited to "ON." When the AWD flag has an appropriate value, such as but not limited to "OFF," this separate torque calculation algorithm will not be triggered, or it will be exited if the vehicle 12 is currently in the AWD propulsion mode such that the vehicle 12 will transition into the 2WD propulsion mode.

If a control device, such as the ECU 36, determines at step S204 that none of the values have a value of "ON" then the control device can proceed to step S206. Here, the control device can set the AWD flag to an appropriate value, such as but not limited to "OFF" representative of a selection of the 2WD propulsion mode. Then the control device can proceed to step S208 and exit the algorithm.

If a control device, such as the ECU 36, determines at step S204 that any one of the flag values has a value of "ON" then the control device can proceed to step S210. Here, the control device can set the AWD flag to an appropriate value, such as but not limited to "ON" representative of a selection of the AWD propulsion mode.

From step S210, a control device, such as the ECU 36, can proceed to step S208 and exit the algorithm. However, as depicted in the flowchart of FIG. 2, the control device can follow additional steps that can permit the control device to seamlessly transition the vehicle 12 between the 2WD propulsion mode and the AWD propulsion mode. Thus, instead of moving from step S210 directly to step S208, the control device can proceed to step S212.

Here, a control device, such as the ECU 36, can set an initial value for the AWD bias command. The AWD bias command can be used by the control device, or a different controller, to modulate the distribution of torque between the primary set of wheels and the supplemental set of wheels under the guidance of the separate torque modulation algorithm referenced above. For example, the torque output by a source such as the power source 18 can be distributed in one of a plurality of percentage ratios such as but not limited 60% to the primary set of wheels and 40% to the supplemental set of wheels. This separate torque modulation algorithm can also permit the control device, such as the ECU 36, or another control device, to modulate the distribution of torque between each wheel of primary set of wheels and/or each wheel of the supplemental set of wheels, where the vehicle 12 is provided with the appropriate powertrain components. In the exemplary embodiment of the vehicle 12 of FIG. 1, the rear differential actuator assembly 40 can be configured in a manner such as that disclosed in the above-referenced U.S. Patent Application Publication No. 2007/0260388. This exemplary arrangement can permit the control device to signal the actuator to distribute an identical torque or a differential torque to each of the supplemental set of wheels, such as the rear wheels 16L, 16R.

In the exemplary embodiment, the AWD bias command can be set to a base, or default, bias value. This value can represent a percentage ratio that can provide the most advantageous tractive effort while simultaneously providing as near as possible a neutral handling characteristic, where the neutral handling is neither an oversteering nor an understeering condition.

The operator may perceive an abrupt transition of the vehicle 12 between the 2WD propulsion mode and the AWD propulsion mode. This abrupt transition may be perceived negatively by the operator and/or passenger(s) of the vehicle 12. If a control device, such as the ECU 36, applies a blend function based on appropriate dynamic conditions of the vehicle 12, then the control device can gradually alter the transition between the 2WD propulsion mode and the AWD propulsion mode. This can provide a seamless transition between the 2WD propulsion mode and the AWD propulsion mode, as perceived by the operator, or passenger(s), of the vehicle 12.

From step S212, a control device, such as the ECU 36, can proceed to step S214. At step S214, the control device can determine a blend function. In this exemplary embodiment, the blend function can rely on data from the position sensor 50 associated with the brake pedal 48 and data from the position sensor 46 associated with the accelerator pedal 44. Any appropriate mathematical expression of the blend function can be used that is consistent with the desired performance specifications of the vehicle 12.

Then, a control device, such as the ECU 36, can proceed to step S216 where the control device can modify the initial AWD bias command set at step S212 in accordance with the blend function. Then, control device can proceed to step S208 where the ECU 36 can exit the algorithm.

Thus, a method and system in accordance with the disclosed subject matter can select the most advantageous one of the 2WD propulsion mode and the AWD propulsion mode based on real-time acceleration of the vehicle 12. Additionally, other complimentary factors can be relied on to select the AWD propulsion mode in order to address an impending acceleration. Further, a method and system in accordance with the disclosed subject matter can seamlessly transition to the AWD propulsion mode when the vehicle 12 is subject to relatively large accelerations and seamlessly transition to the 2WD propulsion mode when the vehicle 12 is subject to relative low accelerations or when the vehicle is cruising at a substantially constant speed.

In accordance with the exemplary algorithm represented in FIG. 2, there might be certain scenarios where the ECU 36 could set the delta flag value to "ON" even though the AWD propulsion mode might not be advantageous. For example, under certain deceleration conditions, or under all deceleration conditions, the comparison of the delta position value could be greater than the delta threshold if the delta position value is determined as an absolute value. In order to preclude selection of the AWD propulsion mode during certain deceleration conditions or all deceleration conditions, a control device, such as the ECU 36, can follow an alternate algorithm depicted by the flowchart of FIG. 3 in order to determine the value for the delta flag. These additional steps can add further refinement to the control device's ability to select the most advantageous one of the AWD propulsion mode and the 2WD propulsion mode.

Figure 3:
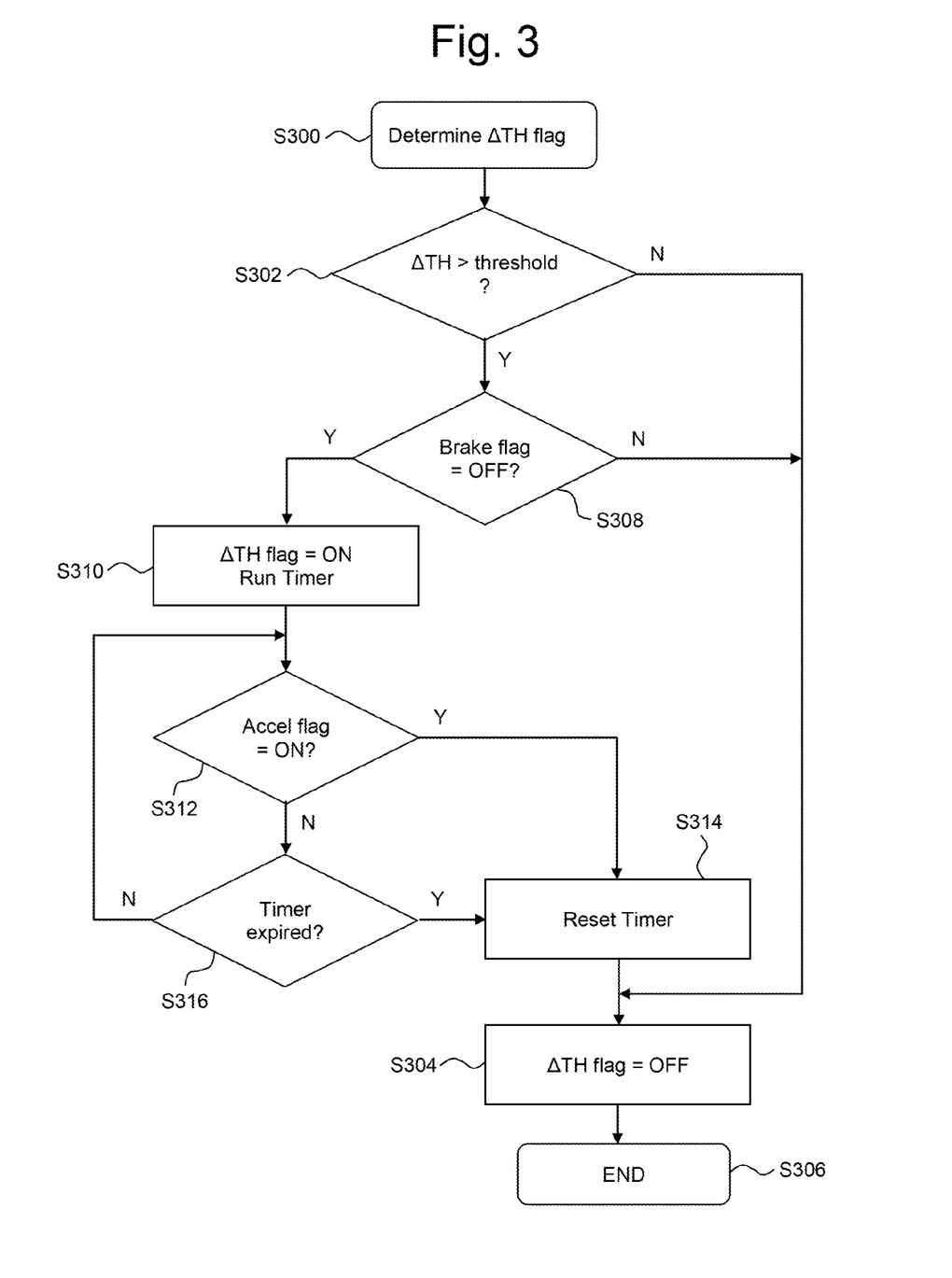
FIG. 3 is a flowchart representative of a process for determining a flag value used in conjunction with the process of FIG. 2.

A control device, such as the ECU 36, can begin this algorithm at step S300. This algorithm can be a subroutine of step S202 of the algorithm represented by the flowchart of FIG. 2 or this algorithm can be separate from step S202 where an alternate embodiment of step S202 does not address the delta flag value. This algorithm can be executed by the control device during a plurality of iterations of the algorithm depicted in FIG. 2.

From step S300, a control device, such as the ECU 36, can proceed to step S302 where the control device can compare at least two different sets of position data from a sensor associated with an operator input device, such the position sensor 46, to the delta threshold. The control device can determine a delta position value from the difference between the first set of position data from the second set of position data. This difference can be assigned an absolute value or it can be a positive value or negative value, where a negative value indicates a request for deceleration by the operator. The delta threshold can be set at a value that corresponds to the operator's movement of the accelerator pedal 44 to a position that corresponds to a request for vehicle acceleration such as implemented in step S202 of the algorithm FIG. 2.

If a control device, such as the ECU 36, determines that the delta position value is less than or substantially equal to the delta threshold, then the control device can proceed to step S304 where the control device can set the delta flag to an appropriate value, such as but not limited to "OFF" representative of an advantageous 2WD propulsion mode. The control device can then proceed to step S306 where the control device can exit the algorithm depicted by the flowchart of FIG. 3.

If a control device, such as the ECU 36, determines that the delta position value is greater than the delta threshold, then the control device can proceed to step S308. At step S308, the control device can compare the value of a brake flag. This evaluation can provide context for the intent (i.e., acceleration or deceleration) by the operator's change to the position of the accelerator pedal.

The value of the brake flag can be based on data from the position sensor 50 associated with the brake pedal 48 and can be set during the execution of step S308 or set during execution of an algorithm separate from that of FIG. 3. A control device, such as the ECU 36, can determine the value of the brake flag or a controller different from this control device can determine the value of the brake flag and then store the brake flag value in an appropriate memory device that is accessible by the control device during the execution of step S308. If the brake pedal 48 is in its normal position where the operator has not initiated actuation of the brakes, then the control device can set the value of the brake flag to an appropriate value, such as but not limited to "OFF" representative of a non-braking condition of the vehicle 12. If the brake pedal 48 is in any position other than the normal position, then the control device can set the value of the brake flag to an appropriate value, such as but not limited to "ON" representative of a braking condition of the vehicle 12.

In another exemplary embodiment, the brake flag can be set to a value, such as but not limited to "ON" representative of a braking condition of the vehicle 12 if the brake pedal 48 is moved to a first position spaced from the normal position, where the first position is representative of heavy braking or emergency braking. Further, the brake flag can be set to a value, such as but not limited to "OFF" representative of a non-braking condition of the vehicle 12 if the brake pedal is moved to a second position spaced from the normal position, where the second position is closer to the normal position than is the first distance and is representative of light braking. Thus, the control device could select the AWD propulsion mode to advantageously assist rapid stopping or rapidly slowing of the vehicle 12.

If a control device, such as the ECU 36, determines that the brake value has been set to "ON" then the control device can proceed to step S304 where the control device can set the value of the delta flag to an appropriate value, such as but not limited to "OFF" representative of an advantageous 2WD propulsion mode. Then, the control device can proceed to step S306 where the control device can exit the algorithm.

If a control device, such as the ECU 36, determines at step S308 that the brake value has been set to "OFF" then the control device can proceed to step S310 where the control device can set the value of the delta flag to an appropriate value, such as but not limited to "ON" representative of an advantageous AWD propulsion mode.

As discussed above, the delta flag can permit a control device, such as the ECU 36, to anticipate an impending acceleration of the vehicle 12. However, this anticipation is advantageous only until the actual acceleration of the vehicle 12 corresponds to the operator's input to an input device, such as the accelerator pedal 44. Once these two conditions match, control of the selection between the AWD propulsion mode and the 2WD propulsion mode can revert back to the acceleration flag value. In view of this, the control device can initiate a timer during step S310. In an exemplary embodiment, this timer can be a countdown timer. However, any appropriate timer or counter can be implemented. The duration of the timer can be set at any appropriate value based on the desired performance specifications of the vehicle 12.

After initiating the timer, a control device, such as the ECU 36, can proceed to step S312 where the control device can check the current value of the acceleration flag. This step S312 can permit the control device to execute the algorithm of FIG. 3 during several iterations of the exemplary algorithm of FIG. 2 where the value of the acceleration flag can change between the "ON" value and the "OFF" value. If the control device determines that the acceleration flag has been set to a value of "ON", then the ECU 36 can proceed to step S314 where the control device can reset the timer.

A control device, such as the ECU 36, can then proceed to step S304 and set the delta flag to a value of "OFF" and then to step S306 where the control device can exit the algorithm.

If a control device, such as the ECU 36, determines that the acceleration flag has been set to a value of "OFF", then the control device can proceed to step S316 where the control device can check whether the timer has expired.

If a control device, such as the ECU 36, determines that the timer has expired, then the control device can proceed to steps S314, S304 and S306, as described above.

If a control device, such as the ECU 36, determined that the timer has not expired, then the control device can return to step S312.

Thus, steps S308, S310, S312 and S316 can permit a control device, such as the ECU 36, to select the AWD propulsion mode for a predetermined period during which the vehicle's real-time acceleration lags in comparison to operator's input to the accelerator pedal 44.

Figure 4:
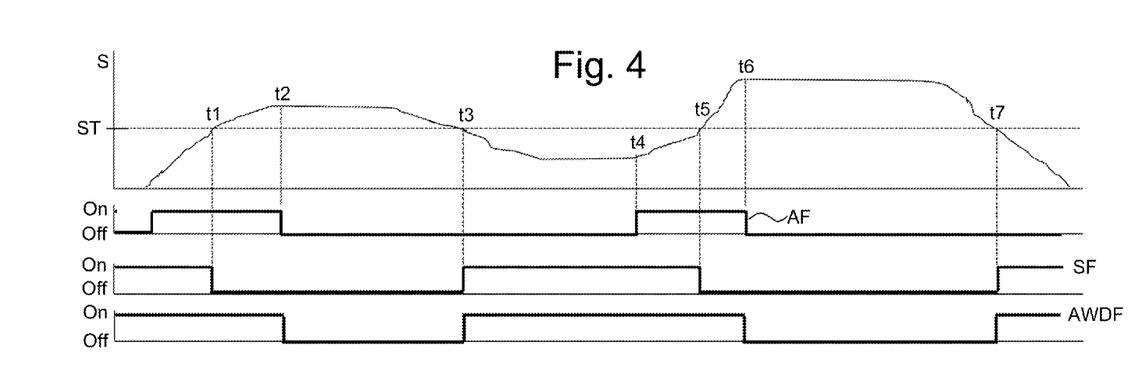
FIG. 4 is a graph comparing sensor data and flag values determined in accordance with the disclosed subject matter.
Figure 5:
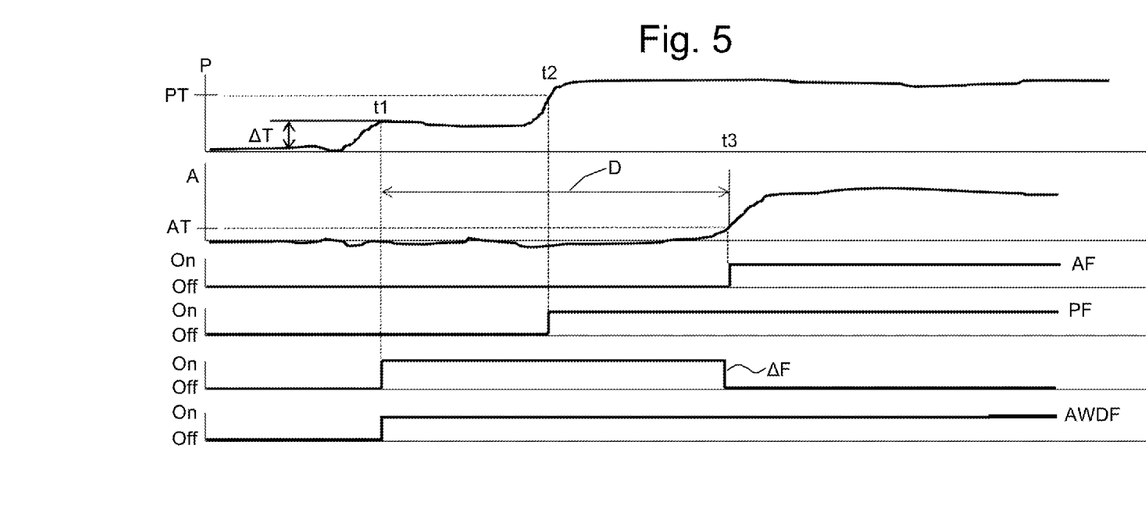
FIG. 5 is a graph comparing sensor data and flag values determined in accordance with the disclosed subject matter.

FIGS. 4 and 5 illustrate exemplary flag values determined by a control device, such as the ECU 36, when executing the algorithms in accordance with the disclosed subject matter.

FIG. 4 illustrates output by a control device, such as the ECU 36, for the acceleration flag AF, the speed flag SF and the AWD flag AWDF based on the plot over time of the wheel speed S derived by the control device from the pertinent wheel speed sensor(s) and the comparison of the wheel speed S to the speed threshold ST and the vehicle acceleration to the acceleration threshold in a manner described above with respect to FIG. 2. In FIG. 4, the vehicle acceleration value is derived from the slope of the illustrated plot of the wheel speed S.

Beginning at an arbitrary start time and continuing to time t1, the acceleration flag AF starts at a value of "OFF" and then changes to a value of "ON" as the wheel speed S increases from a value of zero. During this same region, the speed flag SF has a continuous value of "ON" because the wheel speed S is less than the speed threshold ST. As such, the AWD flag AWDF has a value of "ON" from the start time to time t1.

From time t1 to time t2 the speed flag SF has a value of "OFF" since the wheel speed S is substantially equal to or greater than the speed threshold ST. However, the acceleration flag AF has a value of "ON" because the slope of the wheel speed S exceeds the acceleration threshold. Thus, the AWD flag has a value of "ON" in this region.

From time t2 to time t3 both flags AF, SF have a value of "OFF" because the wheel speed S is greater than the speed threshold ST and the wheel speed S is either constant or decreasing. Therefore, the AWD flag AWDF has a value of "OFF" in this region. The region from time t6 to time t7 illustrates a like result.

From time t3 to time t4, the acceleration flag AF has a value of "OFF" as the wheel speed S continues to decrease. However, the speed flag SF has a value of "ON" because the wheel speed S has again dropped below the speed threshold ST. This results in the AWD flag having a value of "ON" in this region. The region to the right of time t7 illustrates a similar result.

From time t4 to time t5, the acceleration flag AF has a value of "ON" as the wheel speed S increases. Despite the increase in wheel speed S, its value is less than the speed threshold ST in this region. Thus, the speed flag SF also has a value of "ON" in this region. Although both flags SF, AF have a value of "ON" in the region from time t4 to time t5, only one flag needs to have a value of "ON" for the AWD flag to have a value of "ON". Thus in this region, the AWD flag has a value of "ON."

From time t5 to time t6, the acceleration flag AF has a value of "ON" as the wheel speed S continuous to increase. However, the speed flag SF has a value of "OFF" because it has increased to a value greater than or substantially equal to the speed threshold ST. Because at least one flag (i.e., the acceleration flag AF) has a value of "ON" in this region so too does the AWD flag AWDF.

FIG. 5 illustrates output by a control device, such as the ECU 36, for the acceleration flag AF the position flag PF, the delta flag ΔF and the AWD flag AWDF. The value of the acceleration flag AF is based on the plot over time of the vehicle acceleration A and the comparison of the vehicle acceleration A with the acceleration threshold AT in a manner described above with respect to FIG. 2. The value of the position flag PF and the delta flag ΔF are based on the plot over time of the position P derived by the control device from a sensor, such as sensor 46 associated with an operator input device, such as the accelerator pedal 44, and the comparison of the position P to the position threshold PT and the change in the position P to the delta threshold ΔT in a manner described above with respect to FIG. 3.

Beginning at an arbitrary start time and continuing to time t1, the acceleration flag AF has a value of "OFF" because the vehicle acceleration A is less than the acceleration threshold AT. Also in this region both of the position flag PF and the delta flag ΔF have a value of "OFF" because the position P is less than the position threshold PT and the change of sequential values of the position P are less than their respective thresholds PF, ΔF. Accordingly, the AWD flag AWDF has a value of "OFF."

From time t1 to time t2, the acceleration A remains below the acceleration threshold AT and the position P remains below the position threshold PT. Thus, both of the acceleration flag AF and the position flag PF have a value of "OFF." However, the position P changes value leading into this region where it initially increases to a values greater than the delta threshold ΔT. As such, the delta flag ΔF has a value of "ON" until the timer expires since the vehicle acceleration A is less than the acceleration threshold AT. Thus, the AWD flag AWDF has a value of "ON" in this region.

From time t2 to time t3, the acceleration A remains below the acceleration threshold AT. However, the position P exceeds the position threshold PT such that the position flag PF has a value of "ON." In this exemplary scenario, the delta flag ΔF remains at the value of "ON" because the acceleration flag continues with a value of "OFF" and the timer continues to run. The AWD flag AWDF remains at a value of "ON" because at least one of the position flag PF and the delta flag ΔF need to have a value of "ON" to cause the AWDF value to be "ON."

The region from time t1 to time t3 can represent a condition where there is a delay as compared to the input to the accelerator pedal 44 by the operator of the vehicle 12. This delay is indicated by the double arrow D. Thus, FIG. 5 offers an exemplary depiction of the ability afforded to a control device, such as the ECU 36, by the algorithm of FIG. 2 alone or in combination with that of FIG. 3 to determine an impending acceleration of the vehicle 12 and engage the AWD propulsion mode despite the initial lack of sufficient vehicle acceleration.

Beyond time t3, the position P exceeds the position threshold PT and the vehicle acceleration exceeds the acceleration threshold AT. As such, both of the position flag PF and the acceleration flag AF have a value of "ON." Because the acceleration flag AF has a value of "ON," the delta flag ΔF switches to a value of "OFF." Because at least one flag (i.e., the acceleration flag AF) has a value of "ON' in this region so too does the AWD flag AWDF Thus, cooperative implementation of a primary control path using the acceleration threshold and a separate and independent secondary control path using at least one of the speed threshold, the position threshold and the delta threshold can provide continuous AWD torque distribution under most or all appropriate dynamic conditions to which the vehicle 12 is subject.

Since the above algorithms toggle between two distinct values (e.g., "ON" and "OFF"), it is possible for a control device, such as the ECU 36, to frequently alternate the values of the pertinent flag(s) when the input to the control device fluctuate very near its respective threshold. This phenomenon is referred to as hunting. In order to minimize any adverse effects due to this hunting, the algorithms can be supplemented with a respective state change threshold that must be met before the control device can change the value of a respective flag. However, this additional procedure can be omitted where the desired performance specifications for the vehicle 12 can be met.

Figure 6:
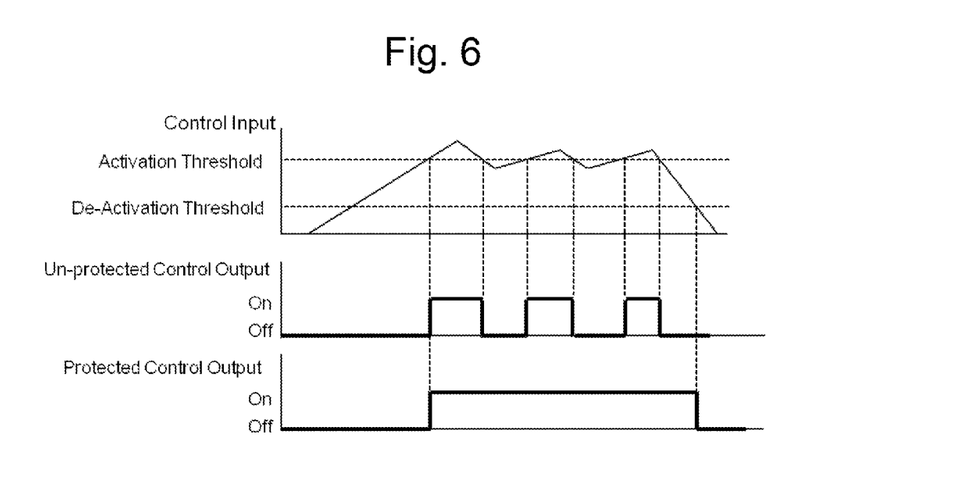
FIG. 6 is a graph comparing an exemplary un-protected control output and an exemplary protected control output in accordance with the disclosed subject matter.

FIG. 6 illustrates a comparison of an exemplary un-protected control output where a state change threshold is not applied to an input signal and an exemplary protected control output where a state change threshold is applied to the same input signal. In this example, the target threshold for setting a flag to a value of "ON" is referred to as an activation threshold and the target threshold for changing the same flag from a value of "ON" to a value of "OFF" is referred to as the deactivation threshold. Here, the deactivation threshold is less than the activation threshold because the signal value exceeds the activation threshold. This control refinement can be applied to the acceleration threshold AT, the position threshold PT and the delta threshold ΔF of FIG. 5 and the associated algorithms of FIGS. 2 and 3.

Where the comparison between the input signal and the activation threshold requires the signal to remain less than the activation threshold, such as for the wheel speed S and the speed threshold ST of FIG. 4 and the algorithm of FIG. 2, then the deactivation threshold can be greater than the activation threshold.

As evident from FIG. 6, the un-protected control output provided by a control device, such as the ECU 36, can hunt between the "ON" value and the "OFF" value as the input signal fluctuates between values very close to the activation threshold. In contrast, the control device can provide a stable control output when it employs the protected control available from the deactivation threshold.

The signals from the wheel speed sensors 42L, 42R, 43L, 43R can be subject to noise caused by electromagnetic interference, irregular driving surfaces, such as but not limited to, gravel, corrugated or washboard driving surfaces, or other sources of noise. In order to minimize or eliminate this noise, a signal conditioning process can be applied to the signals from the wheel speed sensors 42L, 42R, 43L, 43R. An exemplary signal conditioning process can apply a low pass-filter to the signals from the wheel speed sensors 42L, 42R, 43L, 43R. Other appropriate signal conditioning processes can be used in addition to or in place of the use of a low-pass filter. Signals from the position sensor 46 and/or the brake sensor 50 can also be subject to appropriate signal conditioning process to improve signal characteristics for the specific application of the vehicle and/or system.

While certain embodiments of the invention are described above, it should be understood that the invention can be embodied and configured in many different ways without departing from the spirit and scope of the invention. For example, the ECU 36 referred to herein can be configured with hardware alone, or to run software, that permits the ECU 36 to send, receive, process and store data and to electrically communicate with sensors, manual switches, actuators and/or other ECUs via electrical communication lines (not numbered—shown as dotted lines in FIG. 1). These lines can be in the form of wires or can be in the form of wireless communication signals. Electrical communication can be either one-way communication or two-way communication and can be networked or not networked in any manner known in the art.

The sensors 42L, 42R, 43L, 43R, 46, 50, can be configured with hardware, with or without software, to perform the assigned task(s). Each of the sensors 42L, 42R, 43L, 43R, 46, 50 can be configured as a smart sensor such that the sensor 42L, 42R, 43L, 43R, 46, 50 can process the raw data collected by the sensor 42L, 42R, 43L, 43R, 46, 50 prior to transmission to the ECU 36 or any of the sensors 42L, 42R, 43L, 43R, 46, 50 can be configured as a simple sensor that passes the raw data directly to the ECU 36 without any manipulation of the raw data. The sensors 42L, 42R, 43L, 43R, 46, 50 can be configured to send data to the ECU 36, with or without a prompt from the ECU 36.

Alternatively, control system 34 can be supplemented with data from an output shaft speed sensor to indicate the travel speed of the vehicle 12. The transmission output shaft speed sensor can be adjacent an output shaft (not shown) of the transmission 20. The transmission output shaft speed sensor can detect rotation of the output shaft. The raw data can be processed by the transmission output shaft speed sensor (not shown) or by the ECU 36 to indicate a rotational speed of the output shaft and its use is generally known in the art for conversion into a travel speed of the vehicle. The transmission output shaft speed sensor can be any sensor known in the art to provide the appropriate data.

The power source 18 can be an internal combustion engine, an electric motor or a hybrid of the two, all of which are known in the art. The transmission 20 can be an automatic transmission, a manual transmission, or a semi-automatic transmission, and can include a plurality of stepped gear ratios or can have continuously variable gear ratios, all of which are known in the art. The front differential assembly 22 can have any known configuration, including, but not limited to, an open-type differential or a limited-slip-type differential.

The vehicle can also have a different number of wheels, including less than four (possibly being a motorcycle) and more than four, such as in a truck that utilizes AWD.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A system for distributing torque from a power source of a vehicle comprising:
   a first subset of a plurality of wheels driven by the torque when the vehicle is propelled by the power source;
   a second subset of wheels being different from the first subset and selectively driven by the torque when the vehicle is propelled by the power source;
   an accelerator configured to modulate the torque of the power source;
   an actuator assembly selectively engaging the second subset with the torque of the power source; and
   a controller in electrical communication with the actuator assembly and configured to:
   obtain data indicative of a rotational velocity of at least one of the plurality of wheels and data indicative of a position of the accelerator;
   determine a wheel acceleration based on the rotational velocity data;
   compare at least one of the wheel acceleration, the rotational velocity data, and the accelerator position data with a respective one of a plurality of threshold conditions;
   signal the actuator assembly to engage the second subset of wheels with the torque of the power source when one of the threshold conditions is met; and
   signal the actuator assembly to disengage the second subset of wheels from the torque of the power source when none of the threshold conditions is met.

2. The system for distributing torque according to claim 1, further comprising:
   a first sensor in electrical communication with the controller and configured to output data indicative of a rotational velocity of one of the plurality of wheels; and
   a second sensor in electrical communication with the controller and configured to output data indicative of a position of the accelerator.

3. The system for distributing torque according to claim 2, further comprising:
   a third sensor in electrical communication with the controller and configured to output data indicative of a rotational velocity of another one of the plurality of wheels; and
   wherein the controller is further configured to determine the wheel acceleration based on the data from the first sensor and the third sensor.

4. The system for distributing torque according to claim 1, wherein the plurality of threshold conditions include a minimum wheel acceleration, a minimum wheel speed, a minimum delta throttle position, and a high throttle position.

5. The system for distributing torque according to claim 1, wherein:
   the plurality of threshold conditions include a minimum wheel acceleration, a minimum wheel speed, a minimum delta throttle position, a high throttle position;
   the controller is configured to signal the actuator assembly to engage the second subset of wheels when at least one of:
   the wheel acceleration is greater than the minimum wheel acceleration;
   the wheel speed is less than the minimum wheel speed;
   a difference between sequential accelerator position data is greater than the minimum delta throttle position; and
   the accelerator position data is greater than the high throttle position; and
   the controller is configured to signal the actuator assembly to disengage the second subset of wheels when all of:
   the wheel acceleration is less than or substantially equal to the minimum wheel acceleration;
   the wheel speed is greater than or substantially equal to the minimum wheel speed;
   the difference between sequential accelerator position data is less than or substantially equal to the minimum delta throttle position; and
   the accelerator position data is less than or substantially equal to the high throttle position.

6. The system for distributing torque according to claim 1, further comprising a brake actuator in electrical communication with the controller; and
   wherein the plurality of threshold conditions includes a minimum wheel acceleration, a minimum wheel speed, a high throttle position, and a delta throttle position;
   the controller is configured to:
   obtain data indicative of an actuation condition of the brake actuator;
   set a delta flag to a first value for a predetermined time when a difference between sequential accelerator position data is greater than a delta threshold and the actuation condition has a second value;
   set the delta flag to the second value when a difference between sequential accelerator position data is less than or substantially equal to the delta threshold;
   set the delta flag to the second value when the brake actuator is actuated;
   set the delta flag to the second value when the wheel acceleration is greater than the minimum wheel acceleration;
   set the delta flag to the second value when the predetermined time has lapsed and the wheel acceleration is less than or substantially equal to the minimum wheel acceleration;
   signal the actuator assembly to engage the second subset of wheels when at least one of:
   the wheel acceleration is greater than the minimum wheel acceleration;

the wheel speed is less than the minimum wheel speed;
the delta flag is set to the first value; and
the throttle position is greater than the high throttle position; and
signal the actuator assembly to disengage the second subset of wheels when all of:
the wheel acceleration is less than or substantially equal to the minimum wheel acceleration;
the wheel speed is greater than or substantially equal to the minimum wheel speed;
the delta flag is set to the second value; and
the throttle position is less than or substantially equal to the high throttle position.

7. The system for distributing torque according to claim 1, further comprising a brake actuator in electrical communication with the controller; and
wherein the controller is further configured to:
obtain data indicative of an actuation condition of the brake actuator;
determine a blend function based on the actuation condition of the brake actuator and the position data, wherein the blend function describes the rate of change of distribution of the torque and a timing for initiating the change of distribution of torque;
signal the actuator assembly to engage the second subset of wheels in accordance with the blend function; and
signal the actuator assembly to disengage the second subset of wheels in accordance with the blend function.

8. The system for distributing torque according to claim 1, wherein the controller is further configured to compare the at least one of the wheel acceleration, the rotational velocity data, and the position data with a respective one of a plurality of second threshold conditions when the second subset of wheels are engaged by the actuator assembly, wherein each of the plurality of second threshold conditions is different from a respective one of the threshold conditions.

9. The system for distributing torque according to claim 1, wherein the controller is configured to signal condition all data input to the controller.

10. The system for distributing torque according to claim 1, wherein the controller is further configured to:
obtain data indicative of driveline torque; and
compare the driveline torque data with a respective threshold condition related to driveline torque.

11. An on-demand all-wheel-drive powertrain for an automotive vehicle comprising:
a power source configured to output torque;
a multi-ratio transmission driven by the torque output by the power source when the power source propels the vehicle;
at least one wheel driven by the multi-ratio transmission when the power source propels the vehicle;
at least one other wheel selectively driven by the multi-ratio transmission when the power source propels the vehicle;
an accelerator configured to modulate the torque output by the power source;
a first sensor configured to output data indicative of a rotational velocity of the at least one wheel;
a second sensor configured to output data indicative of a position of the accelerator;
an actuator assembly selectively connecting the at least one other wheel to the transmission; and
a controller in electrical communication with each of the actuator assembly, the first sensor and the second sensor, and configured to:
determine a wheel acceleration based on the data output from the first sensor;
compare the wheel acceleration and at least one of the rotational velocity data and the accelerator position data to a respective one of a plurality of all-wheel drive threshold conditions;
select a primary torque path when none of the all-wheel drive threshold conditions are met;
select a supplemental torque path when one of the all-wheel drive threshold conditions is met;
signal the actuator assembly to disconnect the at least one other wheel from the transmission when the primary torque path is selected; and
signal the actuator assembly to connect the at least one other wheel to the transmission when the supplemental torque path is selected.

12. The on-demand all-wheel-drive powertrain according to claim 11, further comprising:
a brake actuator having a first position and a second position; and
a third sensor configured to output data indicative of a position of the brake actuator,
wherein the plurality of threshold conditions includes a minimum wheel acceleration, a minimum wheel speed, a high throttle position, and a delta throttle position, and the controller is configured to:
obtain data indicative of the position of the brake actuator;
set a delta flag to a first value for a predetermined time when a difference between sequential accelerator position data is greater than a delta threshold and the brake actuator is in the second position;
set the delta flag to the second value when a difference between sequential accelerator position data is less than or substantially equal to the delta threshold;
set the delta flag to the second value when the brake actuator is in the first position (ON);
set the delta flag to the second value when the wheel acceleration is greater than the minimum wheel acceleration;
set the delta flag to the second value when the predetermined time has lapsed and the wheel acceleration is less than or substantially equal to the minimum wheel acceleration;
select the supplemental torque path when at least one of:
the wheel acceleration is greater than the minimum wheel acceleration;
the rotational velocity is less than the minimum wheel speed;
the delta flag is set to the first value; and
the throttle position is greater than the high throttle position; and
select the primary torque path when all of:
the wheel acceleration is less than or substantially equal to the minimum wheel acceleration;
the rotational velocity is greater than or substantially equal to the minimum wheel speed;
the delta flag is set to the second value; and
the throttle position is less than or substantially equal to the high throttle position.

13. The on-demand all-wheel-drive powertrain according to claim 11 further comprising:

a front differential assembly driven by the transmission, wherein the at least one wheel is driven by the front differential assembly; and a power-take-off assembly including the actuator assembly, wherein the power-take-off assembly is driven by the transmission when the controller signals the actuator assembly to engage the at least one other wheel, wherein the at least one other wheel is driven by the power-take-off assembly.

14. The on-demand all-wheel-drive powertrain according to claim 11 further comprising:

a front differential assembly driven by the transmission, wherein the at least one wheel is driven by the front differential assembly; and a rear differential driven by the transmission and including the actuator assembly, wherein the at least one other wheel is driven by the rear differential when the controller signals the actuator assembly to engage the at least one other wheel.

15. A method for distributing torque from a power source to a plurality of wheels of a vehicle having a dynamic assistance system configured to supplement an operator's input to the vehicle, the torque being distributed to at least a first subset of the plurality of wheels to propel the vehicle, comprising:

obtaining data indicative of a rotational velocity of one of the plurality of wheels and data indicative of a position of the accelerator;

determining a wheel acceleration based on the rotational velocity data;

comparing the wheel acceleration and at least one of the rotational velocity data and the accelerator position data with a respective one of a plurality of threshold conditions;

signaling an actuator to engage a second subset of the plurality of wheels with the torque of the power source when at least one of the threshold conditions is met; and signaling an actuator assembly to disengage the second subset of the plurality of wheels from the torque of the power source when none of the threshold conditions is met.

16. The method for distributing torque according to claim 15, wherein:

the plurality of threshold conditions include a minimum wheel acceleration, a minimum wheel speed, a minimum delta throttle position, and a high throttle position;

signaling the actuator to engage the second subset of the plurality of wheels includes signaling the actuator assembly to engage the second subset of the plurality of wheels when at least one of:

the wheel acceleration is greater than the minimum wheel acceleration;

the wheel speed is less than the minimum wheel speed;

a difference between sequential accelerator position data is greater than the minimum delta throttle position;

the accelerator position data is greater than the high throttle position; and signaling the actuator assembly to disengage the second subset includes signaling the actuator to disengage the second subset when all of:

the wheel acceleration is less than or substantially equal to the minimum wheel acceleration;

the rotational velocity is greater than or substantially equal to the minimum wheel speed;

the difference between sequential accelerator position data is less than or substantially equal to the minimum delta throttle position; and the accelerator position data is less than or substantially equal to the high throttle position.

17. The method for distributing torque according to claim 15, further comprising:

obtaining data indicative of an actuation condition of a brake actuator;

determining a blend function based on the actuation condition of the brake actuator and the accelerator position data, wherein the blend function describes a rate of change of distribution of the torque and a timing for initiating the change of distribution of torque;

signaling the actuator assembly to engage the second subset of the plurality of wheels in accordance with the blend function; and signaling the actuator assembly to disengage the second subset of the plurality of wheels in accordance with the blend function.

18. The method for distributing torque according to claim 15, further comprising comparing the at least one of the wheel acceleration, the rotational velocity data, and the accelerator position data with a respective one of a plurality of second threshold conditions when the second subset of the plurality of wheels are engaged by the actuator assembly, wherein each of the plurality of second threshold conditions is different from a respective one of the threshold conditions.

19. The method for distributing torque according to claim 15, further comprising conditioning all data input to the controller.

20. The method for distributing torque according to claim 15, further comprising:

obtaining data indicative of driveline torque; and comparing the driveline torque data with a respective threshold condition related to driveline torque.

* * * * *